United States Patent [19]

Nappen

[11] 4,232,052
[45] Nov. 4, 1980

[54] PROCESS FOR POWDERING HIGH FAT FOODSTUFFS

[75] Inventor: Bernard H. Nappen, Cranford, N.J.

[73] Assignee: National Starch and Chemical Corporation, Bridgewater, N.J.

[21] Appl. No.: 19,790

[22] Filed: Mar. 12, 1979

[51] Int. Cl.³ .................... A23D 5/00; A23L 1/34; A23L 1/36; A23L 1/38

[52] U.S. Cl. .................... 426/601; 426/609; 426/629; 426/633; 426/658; 426/661; 426/423

[58] Field of Search .............. 426/96, 98, 102, 292, 426/295, 306, 307, 309, 330.6, 601, 609, 423, 463, 470, 629, 633, 658, 661

[56] References Cited

U.S. PATENT DOCUMENTS

| | | | |
|---|---|---|---|
| 2,797,201 | 6/1957 | Veatch et al. | 260/2.5 |
| 3,396,035 | 8/1968 | Kessinger | 426/609 X |
| 3,660,115 | 5/1972 | Revie | 426/96 |
| 3,689,290 | 9/1972 | Blackstock et al. | 426/96 X |
| 3,881,026 | 4/1975 | Shepherd et al. | 426/96 X |
| 3,940,505 | 2/1976 | Nappen et al. | 426/640 |
| 3,956,509 | 5/1976 | Mitchell et al. | 426/96 X |
| 4,060,645 | 11/1977 | Risler et al. | 426/96 X |
| 4,145,452 | 3/1979 | Cousin et al. | 426/601 X |

*Primary Examiner*—Robert A. Yoncoskie
*Attorney, Agent, or Firm*—Edwin Szala; Ellen T. Dec

[57] ABSTRACT

Dried, free-flowing powdered foodstuffs are produced from high fat containing foods by adding thereto a grinding agent comprising a food-grade film-forming material which has been spray-dried from solution in the presence of a latent gas and which is characterized by a bulk density within the range of 3 to 25 pounds per cubic foot and, additionally in the case of solid foodstuffs, grinding the mixture to effect powdering.

8 Claims, No Drawings

PROCESS FOR POWDERING HIGH FAT FOODSTUFFS

BACKGROUND OF THE INVENTION

I. Field of the Invention

This invention is directed to a process for powdering or grinding foodstuffs having a high fat content and to the free-flowing ground foods produced thereby.

II. Brief Description of the Prior Art

A variety of methods are known for drying foodstuffs to provide powdered, free-flowing forms thereof. Such methods often include addition of starch or other thickening agents; one method is described in U.S. Pat. No. 3,940,505 wherein the foodstuff is comminuted, blended with starch and drum dried. Problems are encountered, however, in powdering or grinding foodstuffs having high fat content, many of which are already in a dried form. Thus, when such dry fatty foods as almonds, peanuts, chocolate liquor, etc. are ground, they are reduced to a pasty consistency rather than to the desired powdered state. Furthermore, other fatty foods such as butter, vegetable oils, and other oil-like substances are difficult to obtain in a powdered or dried form. Heretofore, it has therefore been necessary, for example, to powder or grind such fatty foods cryogenically or to make a paste or emulsion of the food and then spray dry with an inert carrier.

It is an object of the present invention to provide a method for grinding dry fatty foods in solid form directly with no paste formation so as to produce a free-flowing powder.

It is a further object of the invention to provide a method for drying and powdering liquid fatty foods such as butterfat, vegetable oil and other oil-like substances.

SUMMARY OF THE INVENTION

I have now found that high fat containing foodstuffs may be readily powdered to produce free-flowing powders by adding thereto a grinding agent comprising a food-grade film-forming material which has been spray-dried from a solution thereof in the presence of a latent gas and which is characterized by a bulk density within the range of 3 to 25 pounds per cubic foot and, additionally when the foodstuffs is in solid form, grinding to effect powdering. In accordance with the present invention, the specially prepared grinding agent is added to the foodstuff in an amount of 25–400% by weight based on the weight of the fat content of the foodstuff and, if the foodstuffs is in solid form, the mixture then ground using conventional methods.

The resulting food product is characterized by its free-flowing consistency with no paste formation or tendency to agglomerate. The product when desired, may be used directly in its powdered form or may be incorporated into other processed foodstuffs.

DETAILED DESCRIPTION OF THE PREFERRED EMBODIMENTS

Virtually any high fat containing foodstuff may benefit from the teachings of the present invention. For the purposes of the invention, by "high fat containing foodstuff" herein is meant those foodstuffs having a fat content greater than about 30%, preferably greater than 40%. While it will be recognized that foodstuffs having lower fat contents may be ground using the techniques disclosed herein, other useful methods are available for grinding such foods and, as such, they are not included within the scope of the present invention. Suitable foodstuffs therefore include nuts (e.g. almonds, walnuts, peanuts, pecans, etc.), various seeds (e.g. corn germ, sesame seeds, etc.), chocolate and chocolate liquor, as well as pure vegetable oils, oils and fats derived from animal sources (e.g. butterfat, lard, etc.). Additionally included herein are oil-like substances such as vitamins, seasonings (e.g. oleoresins, essential oils, etc.), flavorings (e.g. the non-water solubles constituents of flavors) and high fat prepared foodstuffs (e.g. peanut butter).

The specific grinding agents used in the present invention are those food grade film-forming materials which have been solubilized and spray dried in the presence of a latent gas so as to achieve a bulk density of about 3 to 25 pounds per cubic foot.

Any food grade film-forming material may be employed herein. Generally, these film-formers fall into the three major classifications of starches, dextrins and gums, although a few of the useful materials fall outside these classes. Useful starches include food-grade products derived from corn, rice, potato, sago, tapioca, waxy maize, wheat, etc., as well as any food-grade modifications thereof, for example, the acetate, propionate, and butyrate esters, as well as the hydroxyethyl, hydroxypropyl and carboxymethyl ethers. Suitable dextrins for use herein include the enzymatic, chemical or heat degradation products of starch, such as the dextrins, maltodextrins, British gums, white dextrins, etc. Since it is necessary to employ the film-former in solution form and, since efficiency considerations dictate the use of as high a solids level as possible, it will be recognized that the choice of film-former will be governed in part by the solution viscosity thereof. This factor is of most concern when considering the specific gums to be used since most gums are, by nature, very viscous. Suitable gums for use herein include gum arabic, alginates, pectinates, low viscosity carrageenans, as well as low viscosity synthetic gums such as carboxymethyl cellulose, hydroxypropyl cellulose, methylpropyl cellulose, cellulose xanthate, etc. Other useful film formers include gelatin, soybean protein, zein protein, etc.

The term "latent gas" as used herein refers to any material, whether solid, liquid or gaseous, which can be incorporated in the solution of the film-forming material and which can be converted into a gas, i.e., which produces a gas or is rendered gaseous at an elevated temperature, preferably a temperature at which the film-forming solution may be dried. The agent itself may be a gas, which prior to the conversion is in dissolved form, or it may be a liquid or a solid which volatilizes or reacts with another substance or decomposes to form a gas at such a temperature.

Particularly useful gases which may be employed include dissolved carbon dioxide, and ammonia. Additionally, there are a large number of liquid and solid substances which are decomposable at elevated temperatures or react with other substances to produce gases and are known in the art as blowing agents. Any blowing agent, the residues of which are foodgrade materials, may be employed herein provided it can be incorporated in the solution of film-forming material. Satisfactory blowing agents include inorganic salts selected from the group consisting of carbonates, and bicarbonates, such as sodium bicarbonate, sodium carbonate, ammonium carbonate, ammonium bicarbonate, etc.

Many blowing agents will react with other substances to produce gases. Carbonates for example, such as sodium carbonate, react with acids such as hydrochloric to produce carbon dioxide. Ammonium salts react with bases such as sodium hydroxide to liberate ammonia. Therefore, by feeding in hydrochloric acid solution to a solution of a film-forming material containing a carbonate just as the solution is entering the atomizer section of the spray drier, carbon dioxide is liberated and is present during the spray-drying.

Since the amount of gas or gas-producing substance required will depend, among other factors, upon the concentration of the solution, the amount of gas formed per unit weight of the latent gas material and the size of the particle, specific quantities and ranges cannot be given. In general, however, an amount of latent gas material in the range of about 2-20% by weight of dry film-forming material has been found sufficient.

As previously mentioned, the film-forming material must be solubilized (dispersed) so as to be substantially free of granules. It will be recognized that, depending upon the particular film-forming material, the material may be solubilized directly in water or an aqueous alcoholic solvent or it may be necessary to heat the mixture in order to effect solubilization. It will also be recognized that although the film-former should be substantially solubilized, some undissolved material may be present. As regards the concentration of film-former used, higher concentrations are, of course, preferred since they contribute to the efficiency of the system. The particular solids content employed will, however, depend on the film-former itself. In general, solutions containing 20-40% by weight solids are preferred. The size of the resultant particles will, in part, be affected by the nature and concentration of the particular film-former with larger particles being produced from solutions having higher solid levels. For use in the present invention, particle sizes within the range of about 5 to 120 microns have been found to be preferred.

After solubilization of the film-forming material and incorporation of the latent gas, the solution is spray dried in accordance with conventional techniques in order to produce a grinding agent of suitable bulk density. For use herein, agents having a bulk density of about 3 to 25, preferably 4 to 10, pounds per cubic foot are required.

The production of such particles, including the general details for the spray drying operation are described in detail in U.S. Pat. No. 2,797,201, the disclosure of which is incorporated herein by reference. One of ordinary skill in the art, using the food-grade film-forming materials disclosed herein and, mutatis mutandis, the method taught in the patent, will readily be able to produce grinding agents of required bulk density suitable for use in the present invention.

While it may be recognized that starches, as well as other food-grade film-forming materials have long been known to provide a limited degree of absorption of oil, none have been used or suggested for use with the high fatty foodstuffs contemplated herein. Moreover, nowhere has it been suggested that by spray drying these film-formers in the presence of a latent gas would the oil absorption capability thereof be so dramatically increased.

In order to practice the present invention, the grinding agent produced as described above is merely blended with the foodstuff and then the mixture ground using conventional techniques. Contemplated as exemplary techniques for commercial scale operations are the use of Fitz or Wiley Mills with mesh sizes adjusted to the size of the desired particle. In the case of butterfat, vegetable oils and other liquid foodstuffs, the liquid fat is merely combined with the grinding agent in suitable proportions to achieve a powdered fatty food product.

The amount of grinding agent required will vary depending upon the fat content of the food to be ground as well as the specific film-former used to produce the grinding agent. In general, an amount (by weight) of grinding agent approximately equivalent to the fat content of the particular foodstuff has been found to be optimum, however, the amount of grinding agent may range from about 25% to about 400%, preferably 50% to 200%, by weight of the fat content of the foodstuff may be used herein.

At lower levels of grinding agents, and depending again on the particular foodstuff and grinding agent employed, I have found it may be desirable to add a conventional flow agent such a silicon dioxide or a granular diluent such as unmodified dextrin, starch, cellulose, etc. in order to facilitate production and lower the cost of the desired product. It may also be desirable to add natural or artificial flavorants to the mixture, either before or after grinding to enhance the final flavor thereof.

The fine powdered (ground) foodstuff is characterized by being relatively free-flowing and non-agglomerating and may be used ultimately in such form or it may be incorporated as an adjuvant into other processed foodstuffs. In particular, the powdered foodstuffs are useful in the production of dry mixes such as gravies, soups, salad dressings, puddings, pancake mixes, cake mixes, etc., for flavoring or coating on various snack foods; etc. The ground foodstuffs may also be used as food grade carriers of vitamins, flavors, and aroma-producing oils in tablets or powders.

It is to be noted that these unique food products of this invention can only be adequately described by making reference to the method which has been utilized for their preparation.

The invention will be further illustrated by the examples which follow. The first three examples illustrate the preparation of a grinding agent suitable for use in the present invention.

EXAMPLE I

K-Dex 4484, a tapioca based dextrin available from National Starch and Chemical Corporation, in an amount of 2200 grams was added to 1500 grams tepid water and the slurry heated to 88° C. and held at this temperature for 20 to 30 minutes to effect solubilization. Another 1800 grams of water was then added to cool the solution to 38°-48° C. A solution of 110 grams ammonium carbonate in 624 grams of water was then added to the cooled dextrin solution and the mixture was spray dried at 250°-400° C. using an Anhydro Spray Drier.

The bulk density of the resulting grinding agent was measured as 4.6-6.55 pounds per cubic foot.

EXAMPLE II

Using the general procedures described in Example I, grinding agents suitable for use herein were prepared using the following film-forming agents:
Maltodextrin Crystal Gum (a tapioca based dextrin available from National Starch and Chemical Corporation)

Purity Gum BE (a modified corn starch available from National Starch and Chemical Corporation)

EXAMPLE III

In a similar manner, two additional grinding agents useful herein were prepared from the tapioca-based dextrin of Example I using ammonium bicarbonate and carbon dioxide, respectively, as blowing agents.

EXAMPLE IV

This example illustrates the grinding of almonds to produce a free-flowing powder in accordance with the teachings of the present invention.

A. Sixty-seven grams of almond (containing approximately 54% fat) were mixed with 33 grams of the modified dextrin grinding agent produced in Example I. The mixture was then ground in a Moulinex grinder to form a dry, powdered almond foodstuff.

B. In order to reduce the level of the modified dextrin employed, the procedure described above was repeated using various levels of modified dextrin together with an unmodified dextrin, and in one case, silicon dioxide.

| Ingredients | Amounts (gms.) | | |
|---|---|---|---|
| Almond | 67 | 67 | 67 |
| Modified dextrin | 10 | 10 | 15 |
| Unmodified dextrin of Ex. 1 | 23 | 22 | 18 |
| Silicon dioxide* | — | 1 | — |

*Added after grinding

In all cases, a satisfactory powdered, free-flowing almond product was produced, however, some caking occurred during the grinding operation itself, rendering the procedure more difficult than when the modified dextrin above was employed.

C. In order to ascertain whether other conventional materials could be used as grinding agents herein, the procedure described above was repeated using the materials and amounts shown below:

| Ingredients | Amounts (gms.) | | | |
|---|---|---|---|---|
| Almonds | 80 | 90 | 67 | 67 |
| Modified dextrin of Ex. I. | 20 | 10 | — | — |
| Unmodified dextrin | — | — | 33 | — |
| Corn starch | — | — | — | 33 |

Only the almonds ground using 20 gms. of the modified dextrin produced an acceptable product. Thus, the use of low levels of modified dextrin as well as higher levels of other additives did not facilitate grinding of the high fat containing almonds.

EXAMPLE V

Using the procedures described in Parts A and B of Example IV, peanuts were ground in accordance with the present invention. The ingredients and amounts (in grams) are shown below:

| Ingredients | A | B | C |
|---|---|---|---|
| Dry roasted unsalted peanuts | 67 | 67 | 67 |
| Modified dextrin of Example 1 | 33 | 20 | 10 |
| Unmodified dextrin | — | 12 | 22 |
| Silicon dioxide | — | 1 | 1 |

In all cases, a satisfactory ground, powdered and flowable peanut product was obtained.

Again, attempts were made to grind the high fat containing food-stuff using other materials as grinding aids. Thus, to 67 grams peanuts were added 33 parts of tapioca starch, crystal gum and Solka Floc (a microcrystalline cellulose available from Brown Co.) respectively. All samples caked up and could not be used to produce an acceptable product.

EXAMPLE VI

Other high fat containing foodstuffs were powdered using the procedure described in Example IV. (In the case of vegetable oil, peanuts butter and the Indian celery oleoresin, an "oil-like substance", it was merely necessary to mix the ingredients and no grinding was required.)

| Ingredients | Amounts (gms.) | | | | | | | | |
|---|---|---|---|---|---|---|---|---|---|
| Modified dextrin of Example I | 70 | 50 | 80 | 20 | 38 | 33 | 33 | 30 | — |
| Modified maltodextrin of Example II | — | — | — | — | — | — | — | — | 49 |
| Vegetable oil | 30 | 50 | — | — | — | — | — | — | — |
| Indian celery oleoresin | — | — | 20 | — | — | — | — | — | — |
| Corn germ (approximately 30% fat) | — | — | — | 80 | — | — | — | — | — |
| Chocolate liquor (approximately 53% fat) | — | — | — | — | 67 | — | — | — | — |
| Pecans (approximately 71% fat) | — | — | — | — | — | 67 | — | — | — |
| Peanut butter (approximately 51% fat) | — | — | — | — | — | — | 67 | — | — |
| Vitamin E | — | — | — | — | — | — | — | 51 | 51 |
| Solka-Floc | — | — | — | — | — | — | — | 19 | — |

In all cases, satisfactory powdered, free-flowing food products were readily obtained.

It is further postulated that the artisan, using the techniques disclosed in U.S. Pat. No. 2,797,201 discussed hereinabove and using film-formers which are not food grade materials, would produce similar oil-absorbing products useful in non-food related applications.

Variations may be made in proportions, procedures and materials without departing from the scope of the invention which is defined by the following claims.

I claim:

1. A process for powdering a dry, solid foodstuff which normally forms a paste or grinding having a fat content greater than about 30% to produce a free-flowing powder comprising the steps of adding thereto 25–400% by weight of the fat content of the foodstuff of a grinding agent comprising a food-grade film-forming material which has been spray-dried from solution in the presence of a latent gas and which is characterized by a bulk density within the range of 3 to 25 pounds per cubic foot and grinding the mixture to effect powdering.

2. The process of claim 1 wherein the grinding agent is used in a amount of 50 to 200% by weight of the fat content of the foodstuff.

3. The process of claim 1 wherein the grinding agent has a bulk density of 4 to 10 pounds per cubic foot.

4. The process of claim 1 wherein the foodstuff is selected from the group consisting of nuts, seeds, chocolate, chocolate liquor, and peanut butter.

5. The process of claim 1 wherein the film-forming material is selected from the group consisting of starches, dextrins and gums.

6. The process of claim 1 wherein the film-forming material is dextrin.

7. The process of claim 1 wherein the latent gas is selected from the group consisting of ammonium carbonate, ammonium bicarbonate and carbon dioxide.

8. The process of claim 1 wherein, in addition to the grinding agent, there is also added to the foodstuff a diluent selected from the group consisting of silicon dioxide, unmodified dextrin, starch and cellulose.

* * * * *